United States Patent [19]

Stenudd

[11] Patent Number: 4,721,873
[45] Date of Patent: Jan. 26, 1988

[54] LINEAR STEPPING MOTOR

[75] Inventor: Sven G. W. Stenudd, Lidingö, Sweden

[73] Assignee: Telefonaktiebolaget L M Ericsson, Stockholm, Sweden

[21] Appl. No.: 852,636

[22] Filed: Apr. 16, 1986

[30] Foreign Application Priority Data

Apr. 29, 1985 [SE] Sweden ................................ 8502066

[51] Int. Cl.⁴ ............................................. H02K 41/00
[52] U.S. Cl. .................... 310/12; 310/49 R; 318/135
[58] Field of Search ................................. 320/12–14, 320/49; 318/135

[56] References Cited

U.S. PATENT DOCUMENTS

| | | | |
|---|---|---|---|
| 3,268,747 | 8/1966 | Snowdon | 310/13 |
| 3,707,924 | 1/1973 | Barthalon | 310/12 X |
| 4,126,797 | 11/1978 | Kling | 310/12 X |
| 4,370,577 | 1/1983 | Wakabayashi | 310/12 |
| 4,504,750 | 3/1985 | Onodera | 310/12 |
| 4,581,553 | 4/1986 | Moczala | 310/12 |

Primary Examiner—Donovan F. Duggan
Attorney, Agent, or Firm—Burns, Doane, Swecker & Mathis

[57] ABSTRACT

Stepping motor including a runner (2) and at least one stator (4) relative to which the runner is movably mounted. The stator has at least two mutually parallel magnetizing elements (6,8,10) each with a groove-like space (19) extending in the travelling direction of the runner, pole tooth rows (12) being formed on the inside of the defining side walls of said space. The runner (2) carries an armature element (18) in each groove-like space with tooth rows (20) arranged along the pole tooth rows (12) of the magnetizing element such as to close magnetic flux paths in coaction with the armature element tooth rows, said paths extending via said side walls transverse the travelling direction of the runner (2). The parallel armature elements (18) are carried by a common carrying body (16) of non-magnetic material.

12 Claims, 5 Drawing Figures

LINEAR STEPPING MOTOR

TECHNICAL FIELD

The present invention relates to a linear stepping motor including an armature and a stator, relative to which the armature is movably mounted. The stator has at least two stator elements with pole teeth rows extending in the direction of travel of the armature. The armature has armature elements with pole teeth rows arranged along the pole teeth rows of the stator elements for closing, in coactions, magnetic flux paths transverse the direction of armature travel. The pole teeth rows of the armature and stator elements are mutually displaced such that when the pole teeth of one armature element are in register with the pole teeth of the corresponding stator element the pole teeth of the remaining armature elements are displaced in the direction of armature travel relative the pole teeth of the stator element corresponding to the respective armature element.

BACKGROUND ART

Stepping motors may be used for accurate and exact movement of movable parts in machine tools, printers and other apparatus. In the case of printers it is also known to use a linear stepping motor with an armatur provided with magnetizing windings for the linear movement of the printing head, the armature being mounted on the same carriage as the printing head. By the individual magnetizing windings being here disposed after each other in the travelling direction of the armature, the armature elements will be short with consequently weak power. Another problem is also the limitation which the printing head-carrying armature of the stepping motor signifies for the acceleration capacity of the printing head, due to the weight of the iron cores and windings carried by the armature and the current supplying conductors to the windings which must also be moved. It is thus a desire to enable the implementation of the armature without windings, and instead place the windings with the stator, since such an arrangement enables a minimization of the weight and length of movable parts while maintaining a high quotient of force/mass. However, it has been difficult to find a suitable design of the stepping motor stator and armature for this purpose, since demands of placing the windings so that they do not obstruct the travel of the armature and the ncessity of restricting magnetic leakage losses have so far not been able to be combined in a satisfactory manner with other desirable properties of the apparatus.

An apparatus of the kind defined in the introduction, where the armature lacks a magnetizing winding, is known from FIGS. 1 and 2 in the Swedish patent application 7102912-8. Here the armature is implemented in the form of an elongate bar of magnetic material with a length greatly exceeding the combined length of the three stator elements disposed in register with each other along the direction of travel of the bar. The known apparatus is intended for numerically controlled machine tool applications where the great length of the bar is no disadvantage, due to the design principle used. For reasons which will be understood, the mentioned design principle is not suitable for applications where a small and light object, such as a printing head, is to be moved linearly within a limited space and be capable of rapid accelerations and decelerations.

DISCLOSURE OF INVENTION

A general object of the invention has been to achieve a new design principle for stepping motors, which permits a considerable increase of the runner's acceleration capacity (high quotient of force/mass). A particular object of the invention has also been to achieve a stepping motor structure allowing the use of a small and light armature without magnetizing windings which is well suited to driving a printing head.

The above-mentioned objects have been achieved in accordance with the invention by both stator and armature elements being arranged substantially parallel in a stepping motor of the kind mentioned in the introduction. According to a preferred embodiment, each stator element may have a substantially groove-shaped space extending in the direction of armature travel. The defining side walls of the grooves between stator elements accommodate the pole teeth rows facing towards each other, while the armature may have an armature element in each groove-shaped space with a pole tooth row on each side of the armature element facing towards a corresponding one of the pole teeth rows of the stator element. The armature element is carried by a common carrying body (carriage) of non-magnetic material.

Due to the parallel arrangement of the stator and armature elements there is obtained large freedom of choice with regard to dimensioning the rest of the armature. Also, placing the travel path of the parallel armature elements sunk into the stator elements contributes to this freedom of choice. There is also obtained balancing of useless magnetic forces, transverse the direction of travel, which would otherwise stress bearings considerably. Only driving forces in the direction of travel remain. By having the teeth of the armature and stator elements, coacting with each other for flux connection, run on the inside of the stator elements the flux transferring surface at the respective tooth rows may be made large without thus demanding large dimensions of the runner in its longitudinal and/or transverse direction.

The construction in accordance with the invention also allows in a simple manner the disposition of freely dimensionable stator windings in the longitudinal direction of the stator under the path of travel of the armature.

Taken together, the invention signifies that with the given configuration of the apparatus, considerably greater power than was previously possible may be transferred to the armature.

BRIEF DESCRIPTION OF DRAWING

The invention, as well as further advantages thereof, will be apparent from the description below of some embodiments with reference to the accompanying drawings where.

BEST MODE FOR CARRYING OUT THE INVENTION

Figure 1:
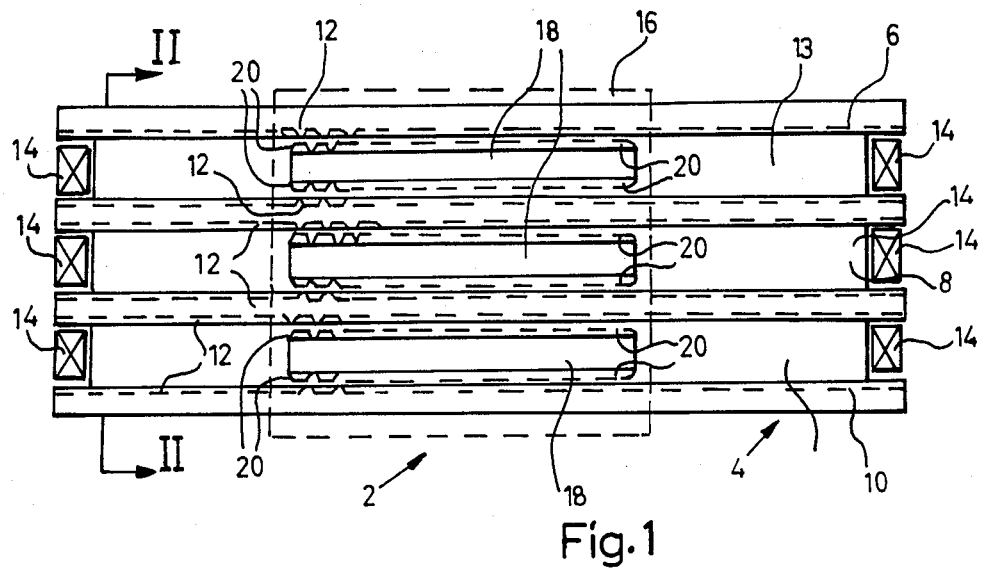
FIGS. 1 and 2a are respectively a plan and a section in the direction of arrows II—II in FIG. 1 illustrating a linear stepping motor in accordcance with the invention.
Figure 2A:
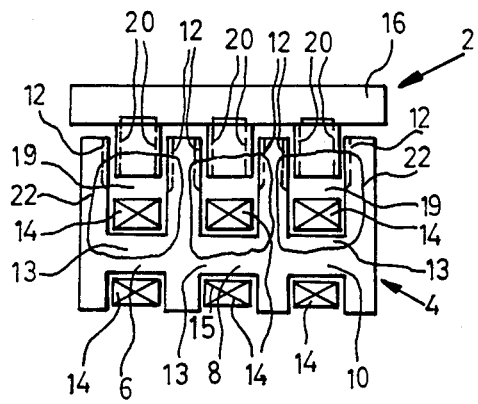

The linear stepping motor illustrated in FIGS. 1 and 2a includes an armature generally denoted by 2, here designated runner, as well as a stator generally denoted by 4, relative to which the runner 2 is movably supported by the intermediary of sutable bearing means not illustrated in the Figures. In simple cases these bearing means may comprise sliding bearings between the runner 2 and stator 4, but ball bearings are also conceivable, of course. The details necessary to incorporate these bearing means will be easily understood by one skilled in the art.

The stator 4 consists of three magnetising elements 6, 8 and 10, which are arranged mutually parallel and are essentially U-shaped in cross section.

They are jointed to each other such that the legs of the intermediate magnetising element 8 are made integral with the respective adjacent legs of the elements 6 and 10 so that a total cross-sectional shape is obtained which may be clearly perceived from FIG. 2a. Of course, in an alternative embodiment of the stator, it may comprise separate elements joined to each other side by side. From the free ends of the stator legs and approximately down to half their height there extend pole teeth on the inside of the legs. These teeth are denoted by 12 in all three magnetizing elements 6-10. Around a crosspiece 13, connecting the legs of each magnetizing element 6,8,10, there is a magnetizing winding 14 extending in the travelling direction of the runner 2. At the ends of the magnetizing elements 6,8,10 the legs may be suitably projecting further out than the cross pieces 13, so that the windings 14 at the ends of the stator are recessed, as appears clearly from FIG. 1. This will enable a plurality of stator modules to be arranged in series after each other if so required. The windings 14 are also recessed on the underside of the stator in longitudinally extending grooves 15 in the stator or in a body, made from an element such as aluminium, fastened to the underside of the stator. For the sake of clarity the longitudinal portions of the windings 14 have been excluded from FIG. 1.

Figure 2B:
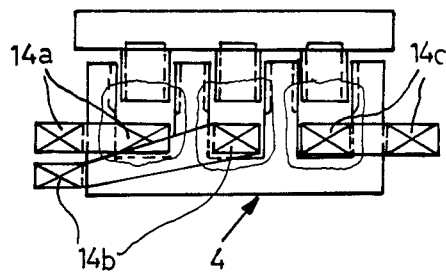
FIG. 2b is an alternative winding arrangement

An alternative arrangement of windings 14 is illustrated in FIG. 2b. Two of the windings 14a and 14c are each surrounding one leg of the stator while the third winding 14b is surrounding two legs. This arrangement simplifies the assembling of the stator and its windings. Runner 2 contains a flat carrying body 16 of a non-magnetic material such as stainless steel, on the underside of which there are recessed three bar-like armature elements 18 of magnetic material. The armature elements 18 are fastened to the carrying body, e.g. by brazing. The carrying body 16 is merely indicated by a dashed line in FIG. 1 for the sake of clarity. The armature elements 18 are dimensioned such that they extend transversely with some play in the respective upper grooves 19 of the stator 4 and thurst into the grooves 19 to a depth substantially corresponding to the width of the pole teeth 12. "Pole tooth width" is intended to describe the dimension in the depth direction of the groove 19. Along the sides of the armature elements 18, facing towards the pole teeth 12, there are corresponding teeth 20 intended for coaction with pole teeth 12 in a way more specifically described below. The pole teeth 12 and 20 are made with the same pitch, although the pole teeth 12 of the magnetising elements 6, 8, 10 are successively displaced relative each other by one third of a tooth pitch from the stator element 6 to the stator element 8 to the stator element 10. Alternatively, there may be such a displacement between the armature elements, of course.

Figure 3:
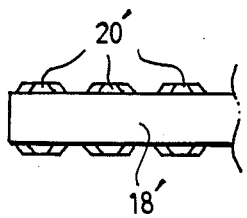
FIGS. 3 and 4 illustrate in plan and side elevation, in enlarged scale in comparison with FIGS. 1 and 2, an end section of one embodiment of an armature element which may be used in the stepping motor illustrated in FIGS. 1 and 2.
Figure 4:
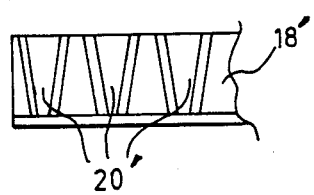

The pole teeth 12 and 20 may have the same straight shape with the flanks extending at right angles to the travelling direction of the runner, but according to an alternative embodiment illustrated in FIGS. 3 and 4 the pole teeth 20' of the anchor elements 18' may be helically cut so that their flanks extend in an acute angle to those of the pole teeth 12. In this way there is achieved, in operation of the stepping motor, an effect of the kind more closely described in the Swedish specification No. 7408952-5, in relative movement between the tooth rows 12 and 20'. The same effect is achieved even if the flanks of the teeth 20 are at right angles to the travelling direction and the teeth 12 are helically cut.

For operation of the stepping motor described above, the windings 14 of the respective magnetizing elements 6, 8, 10 have applied to them a magnetising current via drive pulses in a suitable sequence, so that a magnetic flux, indicated by closed freehand lines 22, occurs in the elements 6, 8, 10 one after the other. A magnetic force is thus induced alternatingly between the respective magnetizing elements and the armature bars 18 running therein. The component of this force in the travelling direction of the runner causes it to move stepwise.

The driving principle described summarily above for an electric stepping motor which is based on the displacement of the pole tooth rows of the stator elements, or the anchor elements, by a given fraction of a tooth pitch in relation to each other, as well as the exciting sequence of the stator element windings is well known to one skilled in the art, e.g. via the above-mentioned Swedish patent specifications, and no more detailed explanations thereof is not required here. However, in the described embodiment the drive pulse sequences shall be suitably displaced a third of a period in relation to each other in correspondence to the above described displacement between the tooth rows 12. The armature or runner speed is reduced and increased by respectively reducing and increasing the drive pulse frequency and the runner direction of travel is determined by the commutation sequence. Purely as an example of a suitable commutation sequence for the described arrangement there is sequence 6, 6+8 8, 8+10, 10, 10+6, 6, 6 and so on for forwards, and sequence 6, 6+10, 10, 10+8, 8, 8+6, 6, 6, and so on for backwards.

The present invention solves in an extremely advantageous way the problem of achieving a high acceleration and low weight of the runner combined with long travel. Furthermore, there is achieved good heat dissipation from the windings via the stator to the structure attached thereto, such as a fastening plate, due to the short heat conduction path.

The dimensions of a stepping motor in accordance with the invention may vary considerably. For driving a printing head in a printer, a length of about 50 cm of the stator could be used, the modular implementation of the apparatus according to FIGS. 1 and 2 could thus be utilized, as necessary, to mount two or more such modules in register with each other for driving a common armature. Magnetizing windings 14 lying in line with each other are then connected in series between the different modules. Parallel connection is also possible, but series connection gives an automatic voltage concentration to the module where the armature is, due to arising inductance conditions. The inactive modules, i.e.

those where the armature does not happen to be, then only take up the voltage corresponding to the respective leakage inductance and resistive voltage drop.

In other embodiments of a linear stepping motor in accordance with the invention for other purposes, the lengths of the modules may have an order of magnitude of several meters, with corresponding up-scaling of remaining dimensions. Such embodiments may be used for machine tools of different sizes, apparatus for moving door members, etc.

Although the invention is described above with some emphasis on its simply and advantageously allowing the use of an armature witout magnetizing windings, the use of the general inventive principle is not limited to such an embodiment. A series of advantages thus remain even if the embodiment according to FIGS. 1 and 2 is modified, for example, so that the armature as well, or solely the armature, is provided with magnetizing windings.

What is claimed is:

1. A linear stepping motor including an armature and a stator relative to which the armature is movably mounted, the stator having at least two stator elements that are arranged substantially parallel to each other in a direction transverse to the direction of movement of the armature, each stator element being provided with pole teeth rows extending in the travelling direction of the armature, said armature also having armature elements arranged parallel to each other and provided with pole teeth rows arranged adjacent the pole teeth rows of the stator elements such as to close magnetic flux paths transverse to the armature travelling direction in coaction with the pole teeth rows of said stator elements, said pole teeth rows of the elements of one of said stator and armature being mutually displaced such that when the pole teeth of one armature element are in register with the pole teeth of the corresponding stator element, the pole teeth of the remaining armature elements are displaced in the direction of travel of the armature relative to the pole teeth of the stator element corresponding to the respective armature element, and wherein each stator element has a substantially groove-shaped space extending in the armature travelling direction, said pole teeth rows of each stator element being situated on side walls of said groove-shaped space and facing towards each other, and wherein the armature has an armature element in each groove-shaped space with a tooth row on either side of the armature element facing towards a corresponding pole tooth row of the stator element, and wherein the armature elements are carried by a common carrying body of non-magnetic material.

2. A stepping motor as claimed in claim 1 wherein at least a portion of a magnetizing winding extends in each groove-shaped space.

3. A stepping motor as claimed in claim 2, wherein each stator element is U-shaped and each winding surrounds the central part of each U-shaped stator element.

4. A stepping motor as claimed in claim 2, wherein at least one winding surrounds one leg of a stator element and at least one winding surrounds two stator element legs.

5. A stepping motor as claimed in claim 2, wherein two adjacent stator elements respectively have two tooth rows adjacently situated but facing away from each other and that are formed in opposing surfaces of a leg common to said two adjacent stator elements.

6. A stepping motor as claimed in claim 2, wherein two adjacent stator elements respectively have two tooth rows, adjacently situated but facing away from each other and that are formed in opposing surfaces of a leg common to said two adjacent stator elements.

7. A linear stepping motor including an armature and a stator relative to which the armature is movably mounted, the stator having at least two stator elements that are arranged substantially parallel to each other in a direction transverse to the direction of movement of the armature, each stator element being provided with pole teeth rows extending in the travelling direction of the armature, said armature also having armature elements arranged parallel to each other and provided with pole teeth rows arranged adjacent the pole teeth rows of the stator elements such as to close magnetic flux paths transverse to the armature travelling direction in coaction with the pole teeth rows of said stator elements, wherein the dimension of the stator elements in the travelling direction of the armature is greater than the corresponding dimension of the armature elements, said pole teeth rows of the elements of one of said stator and armature elements being mutually displaced such that when the pole teeth of one armature element are in register with the pole teeth of the corresponding stator element, the pole teeth of the remaining armature elements are displaced in the direction of travel of the armature relative to the pole teeth of the stator element corresponding to the respective armature element, and wherein each stator element has a substantially groove-shaped space extending in the armature travelling direction, said pole teeth rows of each stator element being situated on side walls of said groove-shaped space and facing towards each other and wherein the armature has an armature element extending in each groove-shaped space with a tooth row on either side of the armature element facing towards a corresponding pole tooth row of the stator element, and wherein the armature elements are carried by a common carrying body of non-magnetic material.

8. A stepping motor as claimed in claim 7, wherein at least a portion of a magnetizing winding extends in each groove-shaped space.

9. A stepping motor as claimed in claim 8, wherein each stator element is U-shaped and each winding surrounds the central part of each U-shaped stator element.

10. A stepping motor as claimed in claim 8, wherein at least one winding surrounds one leg of a stator element and at least one winding surrounds two stator element legs.

11. A stepping motor as claimed in claim 8, wherein two adjacent stator elements respectively have two tooth rows adjacently situated but facing away from each other and that are formed in opposing surfaces of a leg common to said two adjacent stator elements.

12. A stepping motor as claimed in claim 7, wherein two adjacent stator elements respectively have two tooth rows adjacently situated but facing away from each other and that are formed in opposing surfaces of a leg common to said two adjacent stator elements.

* * * * *